United States Patent
McLennan et al.

[11] Patent Number: 5,911,446
[45] Date of Patent: Jun. 15, 1999

[54] PIPE COUPLING FOR PLAIN ENDED PIPE

[75] Inventors: William Ross McLennan; Dennis R. Brown, both of Easton, Pa.

[73] Assignee: Victaulic Company of America, Easton, Pa.

[21] Appl. No.: 08/690,481

[22] Filed: Jul. 31, 1996

Related U.S. Application Data

[63] Continuation of application No. 08/665,478, Jun. 18, 1996, abandoned.

[51] Int. Cl.⁶ .................... F16L 17/04; F16L 19/08
[52] U.S. Cl. .................... 285/104; 285/340; 285/382; 285/373
[58] Field of Search .................... 285/382, 382.7, 285/340, 104, 112, 373; 29/509, 513, 525.03

[56] References Cited

U.S. PATENT DOCUMENTS

| | | | |
|---|---|---|---|
| 2,459,251 | 1/1949 | Stillwagon | 285/112 X |
| 2,491,004 | 12/1949 | Graham | 285/112 X |
| 2,840,395 | 6/1958 | Tarnow | 285/340 X |
| 3,116,078 | 12/1963 | Scherer | 285/112 X |
| 3,453,006 | 7/1969 | Levake | 285/104 |
| 4,146,254 | 3/1979 | Turner et al. | 285/340 X |

*Primary Examiner*—Heather Shackelford
*Attorney, Agent, or Firm*—Abelman, Frayne & Schwab

[57] ABSTRACT

A segmented coupling for use in coupling lengths of plain ended pipe employs cutter members of high strength steel to perform the required interconnection of the pipes, the cutter members being immovably held in the respective coupling segments and, upon tightening down of the coupling being operative to bite into the exterior surface of the associated pipes.

16 Claims, 1 Drawing Sheet

5,911,446

PIPE COUPLING FOR PLAIN ENDED PIPE

CROSS REFERENCE TO RELATED APPLICATION

This application is a CIP of 08/665,478 field Jun. 18, 1996, now abandoned

FIELD OF THE INVENTION

This invention relates to a segmented pipe coupling comprised of two or more coupling segments that are secured to each other in end-to end relationship by traction bolts that extend through bolting pads of the coupling segments.

Segmented pipe couplings are employed for interconnecting lengths of pipe with each other or for connecting a fitting to a length of pipe, the segmented pipe coupling encompassing a sealing gasket that is held in compressed relationship within the segmented pipe coupling upon tightening of the coupling down onto the pipes of fittings.

BACKGROUND OF THE INVENTION

Segmented pipe couplings are well-known in the art, the respective coupling segments of such couplings being comprised of castings of a ductile iron.

The sealing gaskets that are to be positioned within the segmented pipe coupling commonly are formed from an elastomeric material, and include sealing lips, and if desired, a centrally located radially extending stem to be trapped between the adjacent ends of the pipes to be coupled by the coupling.

More commonly, the coupling segments include circumferentially extending keys at their respective opposite sides, the keys being for reception within grooves cut otherwise formed in the exterior circumference of the pipes, the keys acting to resist axial stresses that are generated in the pipes, those axial stresses being absorbed by the coupling as a tensile or a compressive stress.

Other forms of such couplings have been proposed, in which the keys are separate from the coupling and are mechanically affixed to the external surface of the pipes, the keys then being received within grooves provided in the respective coupling segments.

Each of those constructions is encumbered with the disadvantage that either the pipes must be provided with cut or roiled grooves in their outer periphery, with the expense attendant thereon, or, the keys must be affixed mechanically to the pipe periphery, again with the expenses attendant thereon.

Such coupling segments are considered to be of minimal utility in the interconnection of pipes that have not been provided with grooves, or which have not been provided with mechanically attached keys, the reason being that the casting operation employed in the manufacture of the coupling segments, and, the material from which the coupling segments are cast are not conducive to the provision of sharp edges of a sufficient hardness for them to bite into the pipe exterior, in order to provide the required positive, as opposed to frictional, interconnection between the coupling and the respective pipes or fittings.

SUMMARY OF THE INVENTION

The present invention has for its object to provide a segmented pipe coupling formed from coupling segments that can be castings of ductile iron, and which can be employed in the assembly a segmented pipe coupling specifically intended for use in coupling plain ended pipes or fittings, i.e., pipes or fittings that are devoid of grooves for the reception of keys, or which are devoid of keys mechanically affixed to the pipes or fittings.

According to the present invention, coupling segments for assembly into a segmented pipe coupling to be employed with plain ended pipe, are formed for castings of a ductile iron, and, include circumferentially extending recesses in their inner periphery for the reception of harden steel cutter members having cutting edges that extend radially inwardly of the inner periphery of the coupling segments.

The cutter members are secured within the coupling segments by crimping the adjacent walls of the coupling segment in order to securely trap the cutter members within their associated recesses.

The cutter members, at their radially innermost edges are provided with a sharp cutting edge that has been formed on the cutter members by a grinding operation, the cutter members at the respective opposite sides of the coupling segment being inclined towards each other to produce a biting action on the periphery of plain ended pipe that is resistive to axial forces applied to the pipe, and which additionally is resistive to angling or bending forces that may be exerted on the pipes or fittings.

DESCRIPTION OF THE DRAWINGS

The invention will be more readily understood from a reading of the following specification and by reference to the following drawings forming a part thereof, and wherein.

DESCRIPTION OF THE PREFERRED EMBODIMENT

Figure 1:
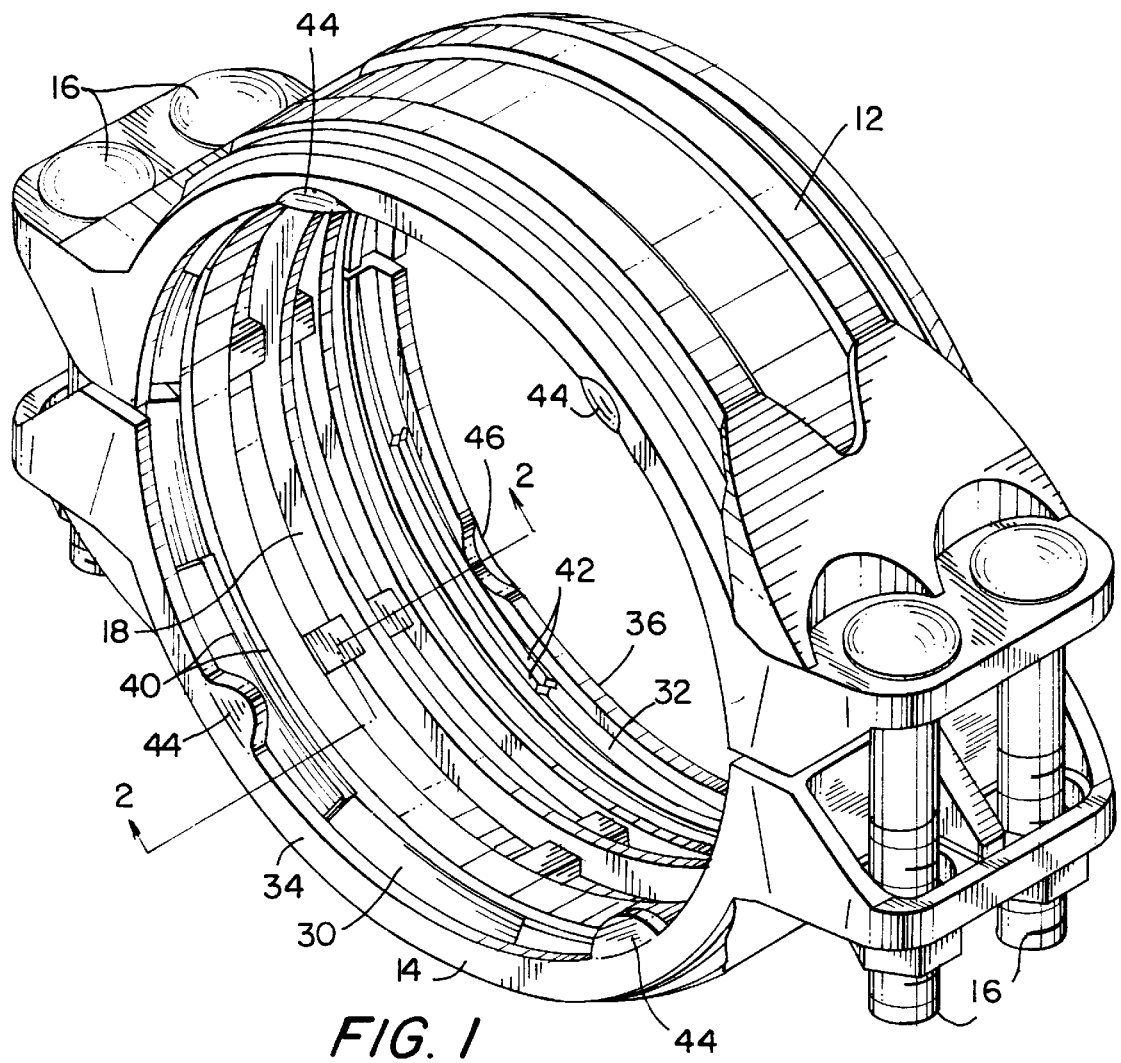
Fig. 1 is a perspective view of a segmented pipe coupling assembled from coupling segments of the present invention.

Referring first to FIG. 1, a segmented pipe coupling is shown which is comprised of coupling segments 12 and 14, which are secured to each other at their opposite ends by traction bolts 16 in a manner well-known in the art.

Figure 2:
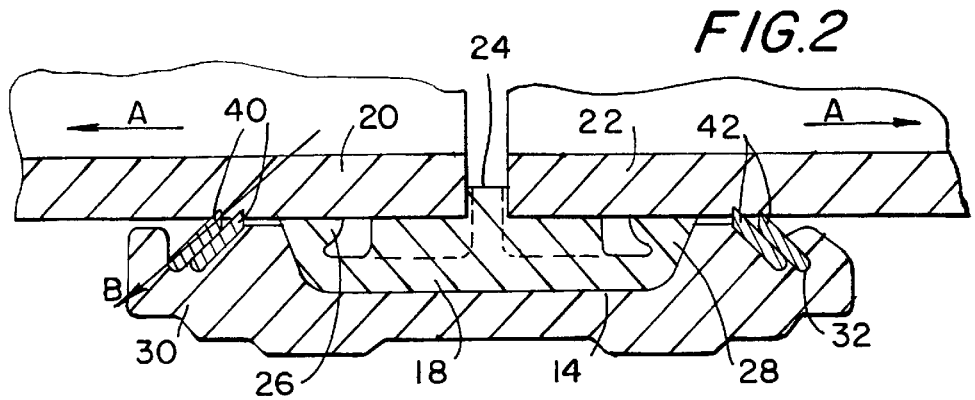
FIG. 2 is a transverse cross-section through one the coupling segments taken on the line 2—2 in FIG. 1, and showing the coupling segment in association with the juxtaposed ends of a pair of pipes.

As is more clearly shown in FIG. 2, the coupling segments 12 and 14 surround and embrace a sealing gasket 18, which, in the assembled condition of the coupling is held under compression against the exterior pipes 20 and 22, that are arranged with their ends in closely adjacent relationship.

Optionally, the sealing gasket 18 includes a stem 24 extending radially inward of the coupling, and which provides a seal between the juxtaposed end faces of the pipes 20 and 22. The sealing gasket 18 includes sealing lips 26 and 28 that are engaged with the outer circumference of the respective pipes, the respective pipes 20 and 22 being devoid of the usual grooves adjacent the and of the pipes, and which usually are provided for the reception of keys on the segmented pipe coupling.

The coupling segments 12 and 14, unlike prior art constructions, do not include locating keys casted integrally with the coupling segment. Instead, channels 30 and 32 are provided adjacent opposite sides of the coupling segments, which are flanked by radially inwardly extending flanges 34 and 36.

Positioned within the respective channels 30 and 32 are arcuately shaped cutter members 40 and 42, the respective cutter members being secured within the channels 30 and 32 by crimps 44 and 46 in the respective radial flanges 34 and 36, thus to hold the cutter members immovable relative to the associated coupling segment 12 or 14.

At the time the segmented coupling is assembled onto the ends of the pipes 20 and 22, upon torquing down of the bolts 16, the cutter members 40 and 42 each bite into the exterior periphery of the associated pipe 20 or 22, thus to hold the respective pipes 20 and 22 against axial movement, as indicated by the arrows A.

The respective cutter members 40 and 42 are each inclined relative to the radial plain, the respective cutter members being inclined towards each other, thus to produce a resultant force in the direction of the arrow B in the respective cutter members 40 and 42, which themselves are bottomed down in the channels 30 and 32, and which thus produce a tensile force in the body of a coupling segment 14.

Formation of the crimps 44 and 46 easily can be accomplished by a staking operation, the material from which the respective segments are formed, ire., ductile iron, being conducive to such a staking operation. That staking operation cannot be carried out on cast iron, due to the crystaline structure of cast iron, thus mandating the casting of the respective coupling segments from a ductile iron capable of deformation by cold-working of the metal.

The cutter members 40 and 42 are fabricated from an entirely different metal, the metal of choice being high strength steel. The respective cutter members themselves are formed as edge wound dished rings of pre-hardened spring tempered flat wires which are then flat ground to produce a sharp cutting edge for biting engagement with the exterior surfaces of the pipes 20 and 22. The sharpened edge wound dished rings are cut to the required length to provide the cutting members 40 and 42. The process of forming the respective cutter members as edge wound dished rings from pre-hardened spring tempered flat wire readily permits the formation of the respective cutter members for them to be arcuate on a radius, which, when the cutter member are installed in the respective coupling segments, will result in the cutting (edges of the cutter members being arranged in concentric relation with the associated coupling segment.

As will be readily apparent, while the segmented pipe coupling described above is intended for use with ductile iron pipe, and for carbon, steel, copper or other metal pipe equally well, the segmented pipe coupling could be employed for coining lengths of pipe of plastics material. Further, in the event that lengths of pipe of plastics material are to be coupled to each other, then, the body of the coupling segments 12 and 14, instead of being castings of a ductile iron could be mouldings of a suitable plastics material that is capable either cold-working, or thermal-plastic deformation in order to secure the cutter members 40 and 42 within the coupling segment.

Other modifications will suggest themselves to persons skilled in the art. For example, instead of providing two sets of cutter members 40 and 42 of lesser arcuate extent than the arcuate extent of the coupling segment, the cutter members can be made of equal arcuate extent to the arcuate extent of the associated coupling segment.

What is claimed is:

1. A coupling segment for a segmented pipe coupling for use with plain ended pipe, said coupling segment including:

at least two channels, one of said at least two channels provided adjacent each opposite side edge of said coupling segment; and at least one cutter member of high strength steel secured within at least said one of said at least two channels by at least one crimp formed in said opposite side edge of said coupling segment, said at least one crimp forming at least a portion of a wall of said one of said at least two channels;

said at least one cutter member being arcuate about a radius and concentric with an inner radius of said coupling segment;

such at least one cutter member having a radially innermost edge providing a cutting edge.

2. The coupling segment of claim 1, in which said coupling segment is a casting of a ductile iron capable of cold-working, wherein at least said at least one crimp is formed by mechanical staking.

3. The coupling segment of claim 1, in which said coupling segment is a molding of a plastics material capable of cold-working, wherein at least said at least one crimp is formed by mechanical staking.

4. The coupling segment of claim 1, in which said coupling segment is a molding of a plastics material capable of thermal working, wherein at least said at least one crimp is formed by thermal staking.

5. The coupling segment of claim 1, in which said at least one cutter member extends at an angle to a longitudinal axis of said coupling segment, said at least one cutter member at a first of said opposite side edges of said coupling segment being arranged in converging relation with respect to said at least one cutter member at a second of said opposite side edges of said coupling segment.

6. The coupling segment of claim 1, including a plurality of said cutter member at said each opposite side edge of said coupling segment.

7. The coupling segment of claim 1, including a plurality of said cutter member arranged in angularly spaced relation at said each opposite side edge of said coupling segment.

8. The coupling segment of claim 1, in which said at least one cutter member is comprised of a metal stamping, and in which said radially innermost cutting edge comprises a ground portion of said at least one cutter member.

9. A coupling segment for a segmented pipe coupling for use in securing the ends of a pipe together, said coupling segment including:

at least two channels, one of said at least two channels provided adjacent each opposite side edge of said coupling segment;

at least one cutter member secured within at least said one of said at least two channels by at least one crimp formed in said opposite side edge of said coupling segment, said at least one crimp forming at least a portion of a wall of said one of said at least two channels;

said coupling segment formed of a first material and said at least one cutter member formed of a second material;

said at least one cutter member being arcuate about a radius and concentric with an inner radius of said coupling segment;

said at least one cutter member having a radially innermost edge providing a cutting edge; and said second material being predeterminedly selected such that said cutting edge can bite into the material forming the pipe.

10. The coupling segment of claim 9, in which said first material is a plastic material.

11. The coupling segment of claim 9 in which both said first material and the material of the pipe or the like are plastic materials.

12. The coupling segment of claim 9, wherein said second material is harder than said first material.

13. The coupling segment of claim 9, including at least one pair of said cutter member, the individual cutter members of said at least one pair of said cutter member being secured within each of said one of said at least two channels provided adjacent each opposite side edge of said coupling segment.

14. The coupling segment of claim 13, wherein the individual cutter members of said at least one pair of said cutter member are of substantially equal arcuate extent.

15. A plurality of coupling segments for a segmented pipe coupling for use with plain ended pipe, each coupling segment of said plurality of coupling segments including:

at least one cutter member of high strength steel secured within said each coupling segment adjacent respective opposite side edges of said each coupling segment by at least one crimp formed in said respective opposite side edges of said each coupling segment;

said at least one cutter member being arcuate about a radius and concentric with an inner radius of said each coupling segment;

such at least one cutter member having a radially innermost edge providing a cutting edge.

16. A plurality of coupling segments for a segmented pipe coupling for use in securing the ends of a pipe or the like together, each coupling segment of said plurality of coupling segments including:

opposite side edges of said each coupling segment;

at least one cutter member secured within said coupling segment by at least one crimp formed in at least one of said opposite side edges of said each coupling segment;

said coupling segment formed of a first material and said at least one cutter member formed of a second material;

said at least one cutter member being arcuate about a radius and concentric with an inner radius of said coupling segment;

said at least one cutter member having a radially innermost edge providing a cutting edge; and said second material being predeterminedly selected such that said cutting edge can bite into the material forming the pipe.

\* \* \* \* \*